(12) United States Patent
Satoh

(10) Patent No.: US 11,048,123 B2
(45) Date of Patent: Jun. 29, 2021

(54) REFLECTIVE LIQUID CRYSTAL DISPLAY DEVICE

(71) Applicant: Sharp Kabushiki Kaisha, Osaka (JP)

(72) Inventor: Takashi Satoh, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 16/571,330

(22) Filed: Sep. 16, 2019

(65) Prior Publication Data

US 2020/0089050 A1 Mar. 19, 2020

Related U.S. Application Data

(60) Provisional application No. 62/733,244, filed on Sep. 19, 2018.

(51) Int. Cl.

| G02F 1/13363 | (2006.01) |
|---|---|
| G02F 1/1335 | (2006.01) |
| G02F 1/1343 | (2006.01) |
| G02F 1/137 | (2006.01) |
| G02F 1/1337 | (2006.01) |

(52) U.S. Cl.
CPC ......... *G02F 1/13363* (2013.01); *G02F 1/137* (2013.01); *G02F 1/1337* (2013.01); *G02F 1/13439* (2013.01); *G02F 1/133528* (2013.01); *G02F 1/133553* (2013.01); *G02F 1/13712* (2021.01); *G02F 1/13787* (2021.01); *G02F 1/133531* (2021.01); *G02F 1/133541* (2021.01); *G02F 1/133562* (2021.01);

(Continued)

(58) Field of Classification Search
None
See application file for complete search history.

(56) References Cited

U.S. PATENT DOCUMENTS 6,108,064 A * 8/2000 Minoura ............. G02F 1/13363
349/113
2004/0223094 A1* 11/2004 Hamada ............. G02F 1/133615
349/63

FOREIGN PATENT DOCUMENTS

JP 11-142836 A 5/1999

\* cited by examiner

*Primary Examiner* — Shan Liu
(74) *Attorney, Agent, or Firm* — Keating & Bennett, LLP

(57) ABSTRACT

A reflective-type liquid crystal display device includes: a first substrate including a light-reflective first electrode; a second substrate including a light-transmissive second electrode; a liquid crystal layer that is provided between the first electrode and the second electrode and takes a generally vertical alignment during black display; a polarizing layer provided on a viewer side of the second substrate; and a first retardation layer, a second retardation layer and a third retardation layer that are arranged in this order from a side of the polarizing layer, wherein $40°\leq|\theta3-2\times\theta2+2\times\theta1|\leq50°$, $130°\leq|\theta3-2\times\theta2+2\times\theta1|\leq140°$, $220°\leq|\theta3-2\times\theta2+2\times\theta1|\leq230°$ or $310°\leq|\theta3-2\times\theta2+2\times\theta1|\leq320°$ is satisfied, where $\theta1$ denotes an angle formed between an absorption axis or a transmission axis of the polarizing layer and a slow axis of the first retardation layer, $\theta2$ an angle formed between the absorption axis or the transmission axis of the polarizing layer and the slow axis of second retardation layer, and $\theta3$ an angle formed between the absorption axis or the transmission axis of the polarizing layer and the slow axis of the third retardation layer.

5 Claims, 3 Drawing Sheets

(52) U.S. Cl.
CPC .. *G02F 1/133742* (2021.01); *G02F 1/133749* (2021.01); *G02F 2203/02* (2013.01)

REFLECTIVE LIQUID CRYSTAL DISPLAY DEVICE

BACKGROUND

1. Technical Field

The present invention relates to a reflective-type liquid crystal display device.

2. Description of the Related Art

A reflective-type liquid crystal display device is suitable for use in a bright environment. While its application has been widened, including digital devices such as mobile phones, smartphones and tablet devices and digital signage, which are used outdoors, there is a demand for improving the display quality.

For example, Patent Document 1 by the present applicant discloses a reflective-type liquid crystal display device whose light efficiency is improved by using a liquid crystal layer that takes a substantially vertical alignment in the absence of voltage application and takes a twist alignment in the presence or voltage application. The reflective-type liquid crystal display device produces display in a normally black mode. According to Patent Document 1 (Japanese Laid-Open Patent Publication No. 11-142336; Japanese Patent No. 3344554), there is obtained a reflective-type liquid crystal display device whose contrast ratio is 20:1 or more. The disclosure of Patent Document 1 is herein incorporated by reference in its entirety.

SUMMARY

As the present inventor studied the reflective-type liquid crystal display device described in Patent Document 1, it was found that the contrast ratio at a diagonal viewing angle (60° viewing angle) was less than 1 in some cases.

The present invention has been made to solve this problem, and an object thereof is to provide a reflective-type liquid crystal display device capable of producing display with a contrast ratio of 1.0 or more at a 60° viewing angle.

An embodiment of the present invention provides a solution as set forth in items below.

[Item 1] A reflective-type liquid crystal display device including:

a first substrate including a light-reflective first electrode;

a second substrate including a light-transmissive second electrode;

a liquid crystal layer that is provided between the first electrode and the second electrode and takes a generally vertical alignment during black display;

a polarizing layer provided on a viewer side of the second substrate; and a first retardation layer, a second retardation layer and a third retardation layer that are arranged in this order from a side of the polarizing layer, wherein $40° \leq |\theta3 - 2\times\theta2 + 2\times\theta1| \leq 50°$, $130° \leq \theta3 - 2\times\theta2 + 2\times\theta1 \leq 140°$, $220° \leq |\theta3 - 2\times\theta2 + 2\times\theta1| \leq 230°$ or $310° \leq |\theta3 - 2\times\theta2 + 2\times\theta1| \leq 320°$ is satisfied, where $\theta1$ denotes an angle formed between an absorption axis or a transmission axis of the polarizing layer and a slow axis of the first retardation layer, $\theta2$ an angle formed between the absorption axis or the transmission axis of the polarizing layer and the slow axis of second retardation layer, and $\theta3$ an angle formed between the absorption axis or the transmission axis of the polarizing layer and the slow axis of the third retardation layer.

[Item 2] The reflective-type liquid crystal display device of Item 1, wherein a contrast ratio at a 60° viewing angle is 1.0 or more.

[Item 3] The reflective-type liquid crystal display device of Item 1 or 2, wherein $160° \leq \theta1 \leq 170°$, $90° \leq \theta2 \leq 100°$, $170° \leq \theta3 \leq 180°$; $250° \leq \theta1 \leq 260°$, $180° \leq \theta2 \leq 190°$, $260° \leq \theta3 \leq 270°$; or $340° \leq \theta1 \leq 350°$, $270° \leq \theta2 \leq 280°$, $350° \leq \theta3 \leq 360°$ are satisfied which are equivalent to $70° \leq \theta1 \leq 80°$, $0° \leq \theta2 \leq 10°$ and $80° \leq \theta3 \leq 90°$.

[Item 4] The reflective-type liquid crystal display device of any one of Items 1 to 3, wherein $|\theta3 - 2\times\theta2 + 2\times\theta1|$ is 45°, 135°, 225° or 315°.

[Item 5] The reflective-type liquid crystal display device of any one of Items 1 to 4, wherein an in-plane retardation of the first retardation layer is 265 nm or more and 285 nm or less, an in-plane retardation of the second retardation layer is 265 nm or more and 285 nm or less, and an in-plane retardation of the third retardation layer is 130 nm or more and 145 nm or less.

[Item 6] The reflective-type liquid crystal display device of any one of Items 1 to 5, wherein the liquid crystal layer includes a nematic liquid crystal material whose dielectric anisotropy is negative and a chiral agent, and takes a generally vertical alignment in an absence of voltage application and takes a twist alignment or a hybrid alignment in a presence of white voltage application.

[Item 7] The reflective-type liquid crystal display device of any one of Items 1 to 6, wherein where $\Delta n$ denotes a birefringence of a liquid crystal material of the liquid crystal layer and d denotes a thickness of the liquid crystal layer, $\Delta nd$, which is a product between $\Delta n$ and d, is 160 nm or more and 400 nm or less.

According to an embodiment of the present invention, it is possible to provide a reflective-type liquid crystal display device capable of producing display with a contrast ratio of 1.0 or more at a 60° viewing angle. Note that a 60° viewing angle refers to a viewing angle such that the polar angle from the normal to the display surface is 60°.

DETAILED DESCRIPTION

A reflective-type liquid crystal display device according to an embodiment of the present invention will now be described with reference to the drawings, but the present invention is not limited to the embodiment described below.

Figure 1:
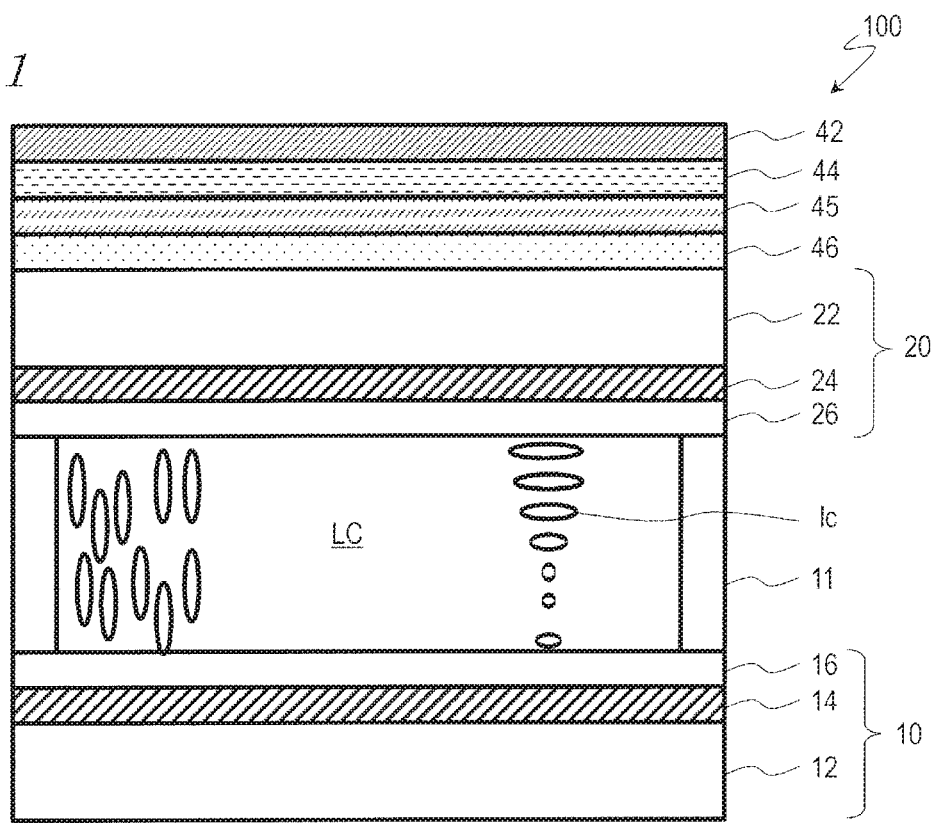
FIG. 1 is a schematic cross-sectional view showing a reflective-type liquid crystal display device 100 according to an embodiment of the present invention.

FIG. 1 is a schematic cross-sectional view showing a reflective-type liquid crystal display device 100 according to the embodiment of the present invention. The reflective-type liquid crystal display device 100 includes a first substrate 10 having a light-reflective first electrode 14, a second substrate 20 having a light-transmissive second electrode 24, and a liquid crystal layer LC provided between the first electrode 14 and the second electrode 24. The first electrode 14 is a reflective pixel electrode and is formed from a metal layer (e.g., an Al layer) or a layered structure of a metal layer and a transparent conductive layer, for example. The second electrode 24 is a common electrode and is formed from a transparent conductive layer (e.g., an ITO layer). The reflective-type liquid crystal display device 100 further includes a polarizing layer 42 provided on the viewer side of the second substrate 20, and three retardation layers 44, 45 and 46 arranged between the polarizing layer 42 and the second substrate 20. They are referred to as the first retardation layer 44, the second retardation layer 45 and the third retardation layer 46 in this order from the side of the polarizing layer 42.

The polarizing layer 42 is a linear polarizing layer and absorbs linearly-polarized light that is parallel to the absorption axis PA (perpendicular to the transmission axis) PA. The liquid crystal layer LC is sealed and held by a seal 11 between the first substrate 10 and the second substrate 20. The first substrate 10 and the second substrate 20 are insulative substrates, and may each be a glass substrate or a plastic substrate, for example. At least the second substrate 20 is transparent. Note that the first substrate 10 and the second substrate 20 may each be a flexible substrate.

The liquid crystal layer LC of the reflective-type liquid crystal display device 100 takes a generally vertical alignment during black display. That is, while the reflective-type liquid crystal display device 100 may be either a normally black mode (e.g., a VA mode) or a normally white mode (e.g., a TN mode), a normally black mode where black display is produced in the absence of voltage application will be illustrated below.

The liquid crystal layer LC includes a chiral nematic liquid crystal material whose dielectric anisotropy Δε is negative, for example. A chiral nematic liquid crystal material includes a nematic liquid crystal material whose dielectric anisotropy Δε is negative and a chiral agent. The liquid crystal layer LC takes a generally vertical alignment (see the left portion of the liquid crystal layer LC of FIG. 1) in the absence of voltage application, and takes a twist alignment or a hybrid alignment (see the right portion of the liquid crystal layer LC of FIG. 1) in the presence of white voltage application. The left portion of the liquid crystal layer LC of FIG. 1 schematically shows how liquid crystal molecules lc are in a substantially vertical alignment in the absence of voltage application (or in the presence of an applied voltage that is lower than the threshold voltage) through the liquid crystal layer LC, and the right portion of the liquid crystal layer LC schematically shows how the liquid crystal molecules lc are in a twist alignment in the presence of white voltage application through the liquid crystal layer LC.

As shown in FIG. 1, the liquid crystal layer LC typically has a pretilt angle of about 89°, for example, relative to a plane that is parallel to the liquid crystal layer LC in the absence of voltage application due to the anchoring force of vertical alignment films 16 and 26. Note that the azimuthal direction (alignment direction) in which the liquid crystal molecules lc are pre-tilted is regulated to be a predetermined azimuthal direction through rubbing or an optical alignment treatment, for example. The predetermined direction may be an angle of 0° or more and less than 180° relative to the absorption axis PA of the polarizing layer 42.

Subjecting both of the vertical alignment films 16 and 26 to an alignment treatment gives a liquid crystal layer LC that takes a twist alignment, and subjecting only one of the films to an alignment treatment gives a liquid crystal layer LC that takes a hybrid alignment. They result in reflective-type liquid crystal display devices that produce display in a VATN mode and a VAHAN mode, respectively. The substrate to be subjected to an alignment treatment when producing a reflective-type liquid crystal display device of a VAHAN mode may be either substrate, but when it is subjected to a rubbing treatment, it is preferably the substrate for which the step on the surface of the alignment film is smaller. The present invention is not limited to a vertical alignment but may be of a TN mode where horizontal alignment films are arranged on both substrates, and both of the alignment films are subjected to a rubbing treatment to obtain a cell in which a liquid crystal having a positive dielectric anisotropy is arranged.

The polarizing layer 42, the first retardation layer 44, the second retardation layer 45 and the third retardation layer 46 refer to optical layers that have the respective functions. Although not shown in the figure, in addition to these optical layers, a protection layer (e.g., a TAC layer) and/or an adhesive layer (including a pressure sensitive adhesive layer) are arranged between these optical layers. Herein, for the sake of simplicity, the protection layer and/or the adhesive layer are ignored. Where the protection layer and/or the adhesive layer have a retardation, these layers and the retardation layers as a whole can be made to be equivalent to the first retardation layer 44, the second retardation layer 45 and the third retardation layer 46.

Typically, $40° \leq |\theta3 - 2\times\theta2 + 2\times\theta1| \leq 50°$, $130° \leq |\theta3 - 2\times\theta2 + 2\times\theta1| \leq 140°$, $220° \leq |\theta3 - 2\times\theta2 + 2\times\theta1| \leq 230°$, $310° \leq |\theta3 - 2\times\theta2 + 2\times\theta1| \leq 320°$ are satisfied, where $\theta1$ denotes the angle formed between the absorption axis of the polarizing layer 42 and the slow axis of the first retardation layer 44, $\theta2$ the angle formed between the absorption axis of the polarizing layer 42 and the slow axis of the second retardation layer 45, and $\theta3$ the angle formed between the absorption axis of the polarizing layer 42 and the slow axis of the third retardation layer 46. Particularly, it is preferred that $|\theta3 - 2\times\theta2 + 2\times\theta1|$ is 45°, 135°, 225° or 315°. That is, for the relationship $40° \leq |\theta3 - 2\times\theta2 + 2\times\theta1| \leq 50°$, the relationship is optically equivalent even when 90°, 180° or 270° is added to the angles. Note that when the value of $|\theta3 - 2\times\theta2 + 2\times\theta1|$ is 360° or more, 360° is subtracted from the value to obtain a value of 0° or more and less than 360°. Although the absorption axis of the polarizing layer 42 is herein used as the reference, the same relationship holds when the transmission axis is used as the reference.

The first retardation layer 44 and the second retardation layer 45 are so-called λ/2 plates, and the third retardation layer 46 is a so-called λ/4 plate. λ denotes the wavelength of visible light, and the wavelength range of primary visible light is 400 nm or more and 720 nm or less. Therefore, an in-plane retardation (hereinafter referred to simply as retardation) of the first retardation layer 44 and the second retardation layer 45 is 265 nm or more and 285 nm or less, for example, and the retardation of the third retardation layer 46 is 130 nm or more and 145 nm or less, for example. Note that in the present specification, phase difference may be represented by retardation nm).

As described above, the first retardation layer 44, the second retardation layer 45 and the third retardation layer 46 are arranged so that circularly-polarized light is incident upon the liquid crystal layer LC.

As will be described using a simulation example, using these three retardation layers, the reflective-type liquid crystal display device 100 can realize display with desirable viewing angle characteristics where the normal direction CR is 50:1 or more and the 60° viewing angle CR is 1.0 or more.

Figure 2:
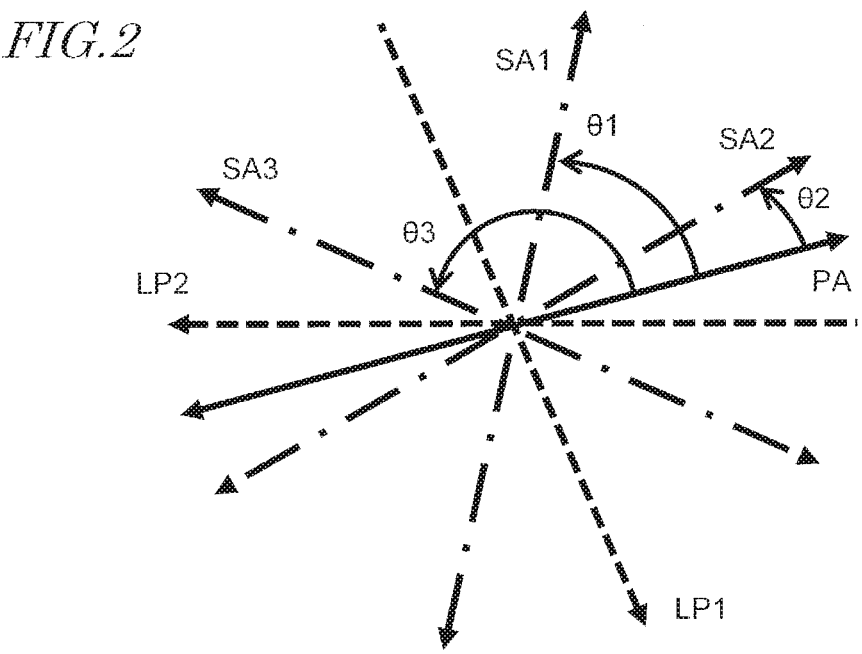
FIG. 2 schematically shows the positional relationship between the slow axis SA1 of the first retardation layer, the slow axis SA2 of the second retardation layer and the slow axis SA3 of the third retardation layer with respect to the absorption axis PA of the polarizing layer of the reflective-type liquid crystal display device 100.

FIG. 2 schematically shows the relationship between the slow axis SA1 of the first retardation layer 44, the slow axis SA2 of the second retardation layer 45 and the slow axis SA3 of the third retardation layer 46 of the reflective-type liquid crystal display device 100. The slow axis SA1 of the first retardation layer 44, the slow axis SA2 of the second retardation layer 45 and the slow axis SA3 of the third retardation layer 46 are denoted as θ1, θ2 and θ3, respectively, with respect to the absorption axis PA, as the reflective-type liquid crystal display device 100 is seen from the viewer side. The twist alignment of the liquid crystal layer is twisted counterclockwise from the pretilt direction LP2 of the liquid crystal molecules on the second vertical alignment film 26 toward the pretilt direction LP1 of the liquid crystal molecules on the first vertical alignment film 16.

Illustrated below is a case where only the pretilt direction LP1 of the liquid crystal molecules on the first vertical alignment film 16 is regulated while the pretilt direction LP2 of the second vertical alignment film 26 is not regulated (no alignment treatment is performed), and the result where the product between Δnd of the liquid crystal layer (the birefringence Δn (589 nm) of the liquid crystal material of the liquid crystal layer) and the thickness (referred to also as the cell gap) d of the liquid crystal layer is 276.5 nm will be described. Note that the following result holds true also when the pretilt direction LP2 of the second vertical alignment film 26 is regulated (i.e., a VATN mode).

Figure 3:
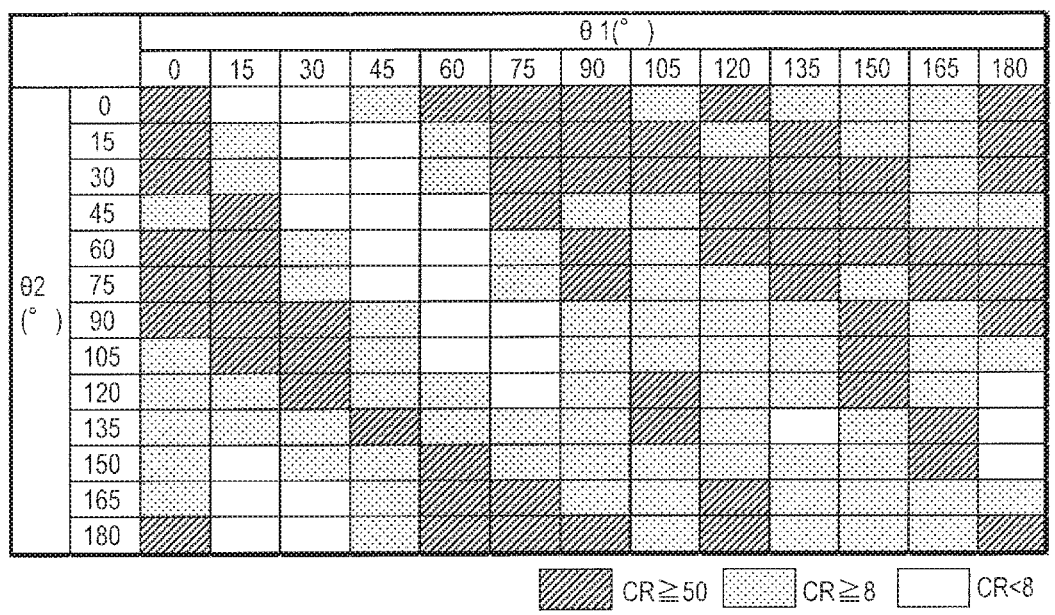
FIG. 3 shows the relationship between the normal direction contrast ratio (hereinafter referred to as "the normal direction CR"), $\theta1$ and $\theta2$.

FIG. 3 shows the results of calculating the normal direction CR for various combinations of θ1 and θ2 that satisfy |θ3−2×θ2+2×θ1|=225° with the configuration described above, and FIG. 4 shows the results of calculating the 60° viewing angle CR. The results where the azimuthal angle (the angle from the horizontal direction; counterclockwise is positive) is 120° will be illustrated. Note that LCD master 3D (from Shintech) was used for the calculation. Note that as for the transmittance of a polarizing layer, the transmittance of light that once passes through a polarizing layer, is reflected by a reflective electrode and passes again through the polarizing layer (corresponding to transmittance of two polarizing layers in parallel Nicols arrangement) was 35.2%, and the transmittance of light that once pass through a polarizing layer, is reflected by a reflective electrode and passes again through the polarizing layer after the polarization axis is rotated by 90° (corresponding to transmittance of two polarizing layers in crossed Nicols arrangement) was 0.02%.

In FIG. 3, dense hatching means that the normal direction CR is 50 or more, light hatching means that the normal direction CR is 8 or more and less than 50, and no hatching (white) means that the normal direction CR is less than 8.

Figure 4:
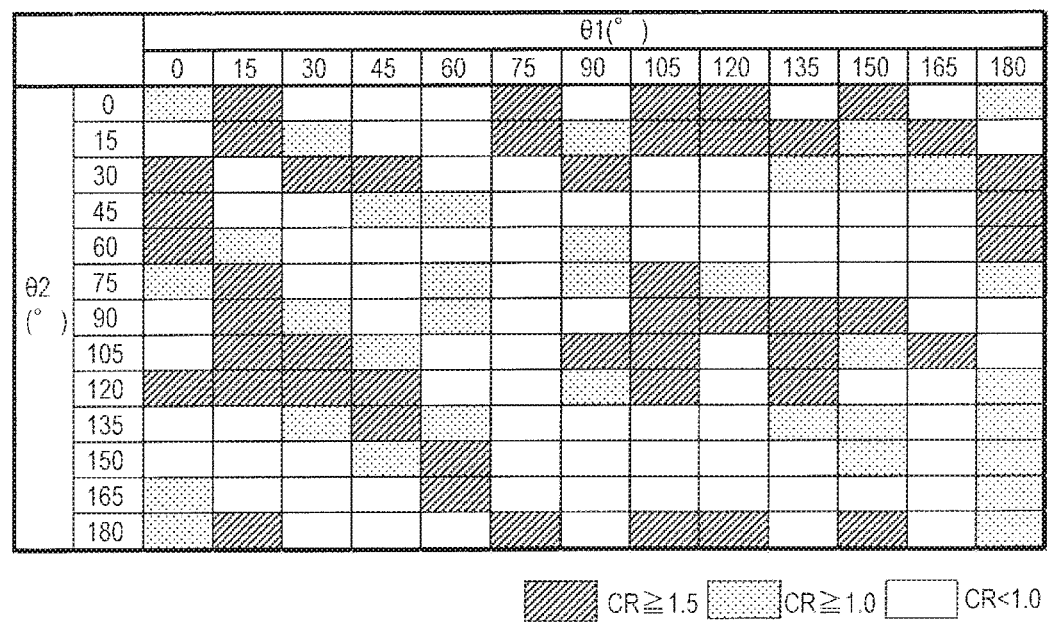
FIG. 4 shows the relationship between the 60° viewing angle contrast ratio (hereinafter referred to as "the 60° viewing angle CR"), $\theta1$ and $\theta2$.

In FIG. 4, dense hatching means that the 60° viewing angle CR is 1.5 or more, light hatching means that the 60° viewing angle CR is 1.0 or more and less than 1.5, and no hatching (white) means that the 60° viewing angle CR is less than 1.0.

Combinations of θ1 and θ2 that are densely-hatched in both of FIG. 3 and FIG. 4 are most preferred, and combinations of θ1 and θ2 that are densely-hatched in one and lightly-hatched in the other are next preferred.

With the configuration that only includes two retardation layers described in Patent Document 1, the 60° viewing angle CR was as low as 0.75, failing to produce those having the 60° viewing angle CR of 1.0 or more. In contrast, as can be seen from FIG. 4, the reflective-type liquid crystal display device according to the embodiment of the present invention, which includes three retardation layers, is capable of realizing viewing angle characteristics such that the 60° viewing angle CR is 1.0 or more for various combinations of θ1 and θ2.

Table 1 and Table 2 below show the results of calculating the normal direction CR and 60° viewing angle CR for each of the combinations between the phase difference and θ1 of the first retardation layer, the phase difference and θ2 of the second retardation layer, and the phase difference and θ3 of the third retardation layer. In Table 1 and Table 2, o means that the normal direction CR is 50 or more and the 60° viewing angle CR is 2.0 or more, and Δ means that the normal direction CR is 8 or more and less than 50 and the 60° viewing angle CR is 1.0 or more and less than 2.0. That is, with the combinations shown in Table 1 and Table 2, the 60°viewing angle CR can be improved.

As illustrated in Table 1 and Table 2, desirable viewing angle characteristics are realized when the phase differences of the first retardation layer and the second retardation layer are 265 nm or more and 285 nm or less, the phase difference of the third retardation layer is 130 nm or more and 145 nm or less, and θ1, θ2 and θ3 satisfy the relationship 220°≤|θ3−2×θ2+2×θ1|≤230°. If 70°≤θ1≤80°, 0°≤θ2≤10° and 80°≤θ3≤90° are satisfied as with the 64 combinations illustrated in Table 1 and Table 2, the relationship described above is satisfied, thereby realizing desirable viewing angle characteristics.

Thus, desirable viewing angle characteristics can be realized when 160°≤θ1≤70°, 90°≤θ2≤100°, 170°≤θ3≤180°; 250°≤θ1≤260°, 180°≤θ2≤190°, 260°≤θ3≤270°; and 340°≤θ1≤350°, 270°≤θ2≤280°, 350°≤θ3≤360° are satisfied, which are equivalent to 70°≤θ1≤80°, 0°≤θ2≤10° and 80°≤θ3≤90°.

TABLE 1

| | First retardation layer | | Second retardation layer | | Third retardation layer | | |
|---|---|---|---|---|---|---|---|
| Combination # | Phase Difference (nm) | θ1 (°) | Phase Difference (nm) | θ2 (°) | Phase Difference (nm) | θ3 (°) | Display quality |
| 1 | 265 | 74 | 265 | 4 | 130 | 84 | o |
| 2 | 265 | 74 | 265 | 4 | 130 | 86 | o |
| 3 | 265 | 74 | 265 | 4 | 145 | 84 | Δ |
| 4 | 265 | 74 | 265 | 4 | 145 | 86 | Δ |
| 5 | 265 | 74 | 265 | 6 | 130 | 84 | Δ |
| 6 | 265 | 74 | 265 | 6 | 130 | 86 | o |
| 7 | 265 | 74 | 265 | 6 | 145 | 84 | Δ |
| 8 | 265 | 74 | 265 | 6 | 145 | 86 | Δ |
| 9 | 265 | 74 | 285 | 4 | 130 | 84 | Δ |
| 10 | 265 | 74 | 285 | 4 | 130 | 86 | Δ |
| 11 | 265 | 74 | 285 | 4 | 145 | 84 | o |
| 12 | 265 | 74 | 285 | 4 | 145 | 86 | o |
| 13 | 265 | 74 | 285 | 6 | 130 | 84 | Δ |
| 14 | 265 | 74 | 285 | 6 | 130 | 86 | Δ |
| 15 | 265 | 74 | 285 | 6 | 145 | 84 | Δ |
| 16 | 265 | 74 | 285 | 6 | 145 | 86 | o |
| 17 | 265 | 76 | 265 | 4 | 130 | 84 | o |
| 18 | 265 | 76 | 265 | 4 | 130 | 86 | Δ |
| 19 | 265 | 76 | 265 | 4 | 145 | 84 | Δ |
| 20 | 265 | 76 | 265 | 4 | 145 | 86 | Δ |
| 21 | 265 | 76 | 265 | 6 | 130 | 84 | o |
| 22 | 265 | 76 | 265 | 6 | 130 | 86 | o |
| 23 | 265 | 76 | 265 | 6 | 145 | 84 | Δ |

TABLE 1-continued

| Combi-nation # | First retardation layer Phase Difference (nm) | θ1 (°) | Second retardation layer Phase Difference (nm) | θ2 (°) | Third retardation layer Phase Difference (nm) | θ3 (°) | Display quality |
|---|---|---|---|---|---|---|---|
| 24 | 265 | 76 | 265 | 6 | 145 | 86 | Δ |
| 25 | 265 | 76 | 285 | 4 | 130 | 84 | Δ |
| 26 | 265 | 76 | 285 | 4 | 130 | 86 | Δ |
| 27 | 265 | 76 | 285 | 4 | 145 | 84 | Δ |
| 28 | 265 | 76 | 285 | 4 | 145 | 86 | Δ |
| 29 | 265 | 76 | 285 | 6 | 130 | 84 | Δ |
| 30 | 265 | 76 | 285 | 6 | 130 | 86 | Δ |
| 31 | 265 | 76 | 285 | 6 | 145 | 84 | Δ |
| 32 | 265 | 76 | 285 | 6 | 145 | 86 | ○ |

TABLE 2

| Combi-nation # | First retardation layer Phase Difference (nm) | θ1 (°) | Second retardation layer Phase Difference (nm) | θ2 (°) | Third retardation layer Phase Difference (nm) | θ3 (°) | Display quality |
|---|---|---|---|---|---|---|---|
| 33 | 285 | 74 | 265 | 4 | 130 | 84 | ○ |
| 34 | 285 | 74 | 265 | 4 | 130 | 86 | ○ |
| 35 | 285 | 74 | 265 | 4 | 145 | 84 | Δ |
| 36 | 285 | 74 | 265 | 4 | 145 | 86 | Δ |
| 37 | 285 | 74 | 265 | 6 | 130 | 84 | Δ |
| 38 | 285 | 74 | 265 | 6 | 130 | 86 | ○ |
| 39 | 285 | 74 | 265 | 6 | 145 | 84 | Δ |
| 40 | 285 | 74 | 265 | 6 | 145 | 86 | Δ |
| 41 | 285 | 74 | 285 | 4 | 130 | 84 | ○ |
| 42 | 285 | 74 | 285 | 4 | 130 | 86 | Δ |
| 43 | 285 | 74 | 285 | 4 | 145 | 84 | ○ |
| 44 | 285 | 74 | 285 | 4 | 145 | 86 | ○ |
| 45 | 285 | 74 | 285 | 6 | 130 | 84 | Δ |
| 46 | 285 | 74 | 285 | 6 | 130 | 86 | Δ |
| 47 | 285 | 74 | 285 | 6 | 145 | 84 | Δ |
| 48 | 285 | 74 | 285 | 6 | 145 | 86 | ○ |
| 49 | 285 | 76 | 265 | 4 | 130 | 84 | Δ |
| 50 | 285 | 76 | 265 | 4 | 130 | 86 | Δ |
| 51 | 285 | 76 | 265 | 4 | 145 | 84 | Δ |
| 52 | 285 | 76 | 265 | 4 | 145 | 86 | Δ |
| 53 | 285 | 76 | 265 | 6 | 130 | 84 | ○ |
| 54 | 285 | 76 | 265 | 6 | 130 | 86 | ○ |
| 55 | 285 | 76 | 265 | 6 | 145 | 84 | Δ |
| 56 | 285 | 76 | 265 | 6 | 145 | 86 | Δ |
| 57 | 285 | 76 | 285 | 4 | 130 | 84 | Δ |
| 58 | 285 | 76 | 285 | 4 | 130 | 86 | Δ |
| 59 | 285 | 76 | 285 | 4 | 145 | 84 | ○ |
| 60 | 285 | 76 | 285 | 4 | 145 | 86 | Δ |
| 61 | 285 | 76 | 285 | 6 | 130 | 84 | Δ |
| 62 | 285 | 76 | 285 | 6 | 130 | 86 | Δ |
| 63 | 285 | 76 | 285 | 6 | 145 | 84 | ○ |
| 64 | 285 | 76 | 285 | 6 | 145 | 86 | ○ |

Figure 5:
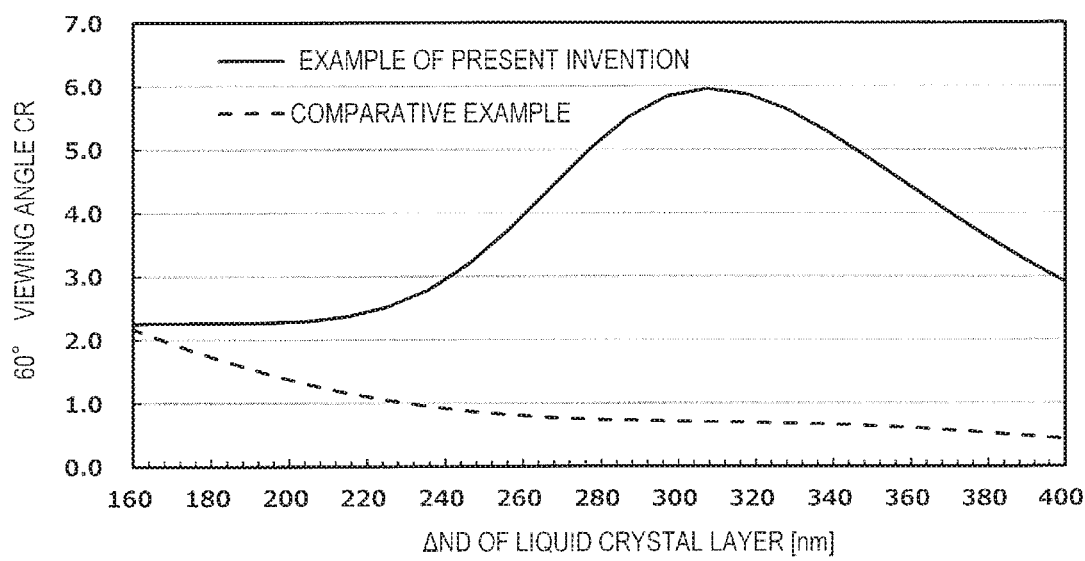
FIG. 5 is a graph showing the relationship between $\Delta nd$ of the liquid crystal layer and the 60° viewing angle CR.
Figure 6:
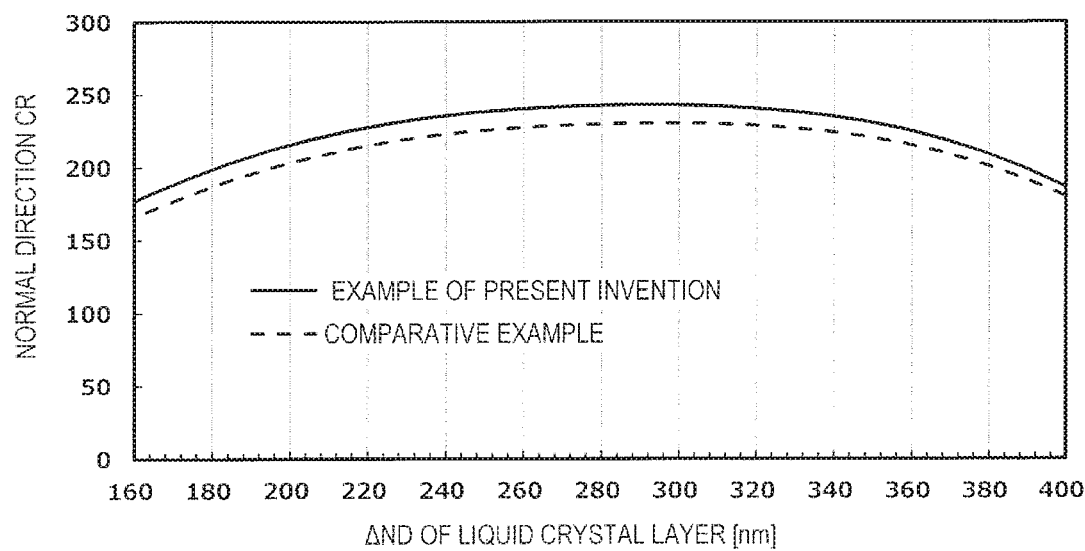
FIG. 6 is a graph showing the relationship between $\Delta nd$ of the liquid crystal layer and the normal direction CR.

FIG. 5 is a graph showing the relationship between Δnd of the liquid crystal layer and the 60° viewing angle CR, and FIG. 6 is a graph showing the relationship between Δnd of the liquid crystal layer and the normal direction CR. Note that the azimuthal angle (the angle from the horizontal direction; counterclockwise is positive) is 120°.

The example of FIG. 5 is an example where the first retardation layer (phase difference: 270 nm, θ1=75°), the second retardation layer (phase difference: 270 nm, θ2=5°, the third retardation layer (phase difference: 140 nm, θ3=85°), LP1=−14.5°, and the absorption axis PA of the polarizing layer is 15° from the horizontal direction, whereas the comparative example is an example where the first retardation layer is absent, the second retardation layer (phase difference: 270 nm, θ2=15°), the third retardation layer (phase difference: 140 nm, θ3=75°), LP1=−14.5°, and the absorption axis PA of the polarizing layer is 15° from the horizontal direction. Note that when LP1=−14.5°, the reflectivity (brightness) at an azimuthal angle of 90° and 180° is high. LP1 can be determined depending on the demanded viewing angle characteristics.

As can be seen from FIG. 5, in the example of the present invention, Δnd of the liquid crystal layer is in the range from 160 nm to 400 nm, and the 60° viewing angle CR is 2.0 or more, thus realizing desirable diagonal viewing angle characteristics. As can be seen from FIG. 6, it is possible to realize a higher value of the normal direction CR than in the comparative example when Δnd of the liquid crystal layer is in the range from 160 nm to 400 nm.

The 60° viewing angle CR shown in FIG. 5 is more dependent on Δnd of the liquid crystal layer than the normal direction CR shown in FIG. 6. This is because the retardation of the liquid crystal layer for light that is incident from the normal direction upon the liquid crystal layer in the black display state (vertical alignment state) is substantially zero, whereas the retardation of the liquid crystal layer for light that is incident diagonally (60° viewing angle) is not zero. The third one of the retardation layers (the first retardation layer) of the reflective-type liquid crystal display device according to the embodiment of the present invention serves to compensate for the retardation of the liquid crystal layer for light that is diagonally incident upon the liquid crystal layer in a vertical alignment state. As a result, this reduces the reflectivity (display brightness) at a diagonal viewing angle during black display, and improves CR at a diagonal viewing angle. From the results of FIG. 5, it can be said that Δnd of the liquid crystal layer is more preferably in the range of 260 nm or more and 370 nm or less.

This application claims priority to U.S. Provisional Patent Application No. 62/733,244 filed on Sep. 19, 2018, the disclosure of which is incorporated herein by reference.

What is claimed is:

1. A reflective-type liquid crystal display device comprising:
   a first substrate including a light-reflective first electrode;
   a second substrate including a light-transmissive second electrode;
   a liquid crystal layer that is provided between the first electrode and the second electrode and takes a generally vertical alignment during a black display;
   a polarizing layer provided on a viewer side of the second substrate; and
   a first retardation layer, a second retardation layer, and a third retardation layer that are arranged in this order from a side of the polarizing layer and attached to the polarizing layer, wherein
   $40° \leq |θ3 − 2×θ2 + 2×θ1| \leq 50°$, $130° \leq |θ3 − 2×θ2 + 2×θ1| \leq 140°$, $220° \leq |θ3 − 2×θ2 + 2×θ1| \leq 230°$ or $310° \leq |θ3 − 2×θ2 + 2×θ1| \leq 320°$ is satisfied, where θ1 denotes an angle formed between an absorption axis or a transmission axis of the polarizing layer and a slow axis of the first retardation layer, θ2 denotes an angle formed between the absorption axis or the transmission axis of the polarizing layer and a slow axis of the second retardation layer, and θ3 denotes an angle formed between the absorption axis or the transmission axis of the polarizing layer and a slow axis of the third retardation layer,
   $160° \leq θ1 \leq 170°$, $90° \leq θ2 \leq 100°$, $170° \leq θ3 \leq 180°$; $250° \leq θ1 \leq 260°$, $180° \leq θ2 \leq 190°$, $260° \leq θ3 \leq 270°$; or 340°≤θ1≤350°, 270°≤θ2≤280°, 350°≤θ3≤360° are satisfied which are equivalent to 70°≤θ1≤80°, 0°≤θ2≤10° and 80°≤θ3≤90°, and a contrast ratio at a 60° viewing angle is 1.0 or more.

2. The reflective-type liquid crystal display device of claim 1, wherein |θ3−2×θ2+2×θ1| is 45°, 135°, 225° or 315°.

3. The reflective-type liquid crystal display device of claim 1, wherein an in-plane retardation of the first retardation layer is 265 nm or more and 285 nm or less, an in-plane retardation of the second retardation layer is 265 nm or more and 285 nm or less, and an in-plane retardation of the third retardation layer is 130 nm or more and 145 nm or less.

4. The reflective-type liquid crystal display device of claim 1, wherein the liquid crystal layer includes a nematic liquid crystal material whose dielectric anisotropy is negative and a chiral agent, and takes a generally vertical alignment in an absence of voltage application and takes a twist alignment or a hybrid alignment in a presence of white voltage application.

5. The reflective-type liquid crystal display device of claim 1, wherein where $\Delta n$ denotes a birefringence of a liquid crystal material of the liquid crystal layer and d denotes a thickness of the liquid crystal layer, $\Delta nd$, which is a product between $\Delta n$ and d, is 160 nm or more and 400 nm or less.

* * * * *